United States Patent
Dugan

Patent Number: 5,085,129
Date of Patent: Feb. 4, 1992

[54] JOINT SYSTEM

[75] Inventor: Larry M. Dugan, Boulder, Colo.

[73] Assignee: Golden Technologies Company, Inc., Golden, Colo.

[21] Appl. No.: 666,234

[22] Filed: Mar. 8, 1991

[51] Int. Cl.⁵ .......................... F16J 1/10; F01B 11/02
[52] U.S. Cl. ...................................... 92/84; 92/129; 92/187; 403/338
[58] Field of Search ................ 92/84, 129, 140, 187, 92/256; 403/344, 338, 312, 313, 225, 227

[56] References Cited

U.S. PATENT DOCUMENTS

| | | | |
|---|---|---|---|
| Re. 33,003 | 8/1989 | Dugan | 92/84 |
| 2,786,359 | 3/1957 | Karlan et al. | 403/225 |
| 2,847,033 | 8/1958 | Baker | 92/84 |
| 3,013,536 | 12/1961 | Cripe | 92/84 |
| 3,544,138 | 12/1970 | Eiff | 403/338 |
| 4,106,393 | 8/1978 | Dodson et al. | 403/338 |
| 4,719,845 | 1/1988 | Dugan | 92/84 |

FOREIGN PATENT DOCUMENTS 3237627  4/1984  Fed. Rep. of Germany ...... 403/338

Primary Examiner—Edward K. Look
Assistant Examiner—Hoang Nguyen
Attorney, Agent, or Firm—Klaas & Law

[57] ABSTRACT

A joint for connecting a driving member having an end surface to a driven member having an end surface wherein a solid, deformable, non-compressible material is located therebetween and associated therewith to provide a space to permit limited relative movement therebetween so that when a force is applied to the driving member to move the driving member toward the driven member, the solid, deformable, non-compressible material deforms to compensate for any misalignment between the driving member and the driven member until it fills the space and the non-compressible characteristic thereof operates so that a uniform force is then transmitted across the end surface of the driven member to move the driven member.

19 Claims, 3 Drawing Sheets

5,085,129

JOINT SYSTEM

BACKGROUND OF THE INVENTION

The invention relates generally to a joint for connecting a driven member to a driving member for reciprocation over a longitudinal axis and more particularly to a joint for connecting the driven member to the driving member to compensate for any misalignment of the longitudinal axis of the driving member with the longitudinal axis of the driven member.

In U.S. Pat. No. RE 33,003, there is disclosed a joint for compensating for any misalignment of the longitudinal axis of a driving member with the longitudinal axis of the driven member when the driving member is applying a driving force on the driven member. While the joint system in this patent functions to produce the desired results, there have been some difficulties experienced in the field during the operation of the joint system. One of these difficulties relates to the overall size of the joint system which presents a problem when it must be located in a relatively small area. Another difficulty relates to the clamping bolts that are threaded into the member. In some instances, these threaded bolts are accidentally broken off that makes disassembly of the joint for any purpose virtually impossible. Therefore, there exists a need for improvements of the joint system disclosed in this patent.

BRIEF DESCRIPTION OF THE INVENTION

This invention provides a joint for compensating for any misalignment of the longitudinal axis of a driving member with the longitudinal axis of the driven member when the driving member is applying a force on the driven member wherein the joint is provided with structures assuring the ready assembly or disassembly thereof and has a relatively small cross-sectional area.

In one preferred embodiment of the invention, the joint is used for increasing the working life of a pump having a cylinder and a piston mounted for reciprocation in the cylinder. A piston rod extends from the piston and has a longitudinal axis and a generally planar end surface. Reciprocating driving means are provided for reciprocating the piston rod and therefore the piston in the cylinder. A member is located between the piston rod and the reciprocating driving means and has a cavity formed therein which cavity has a generally cylindrical inner surface and a generally planar bottom surface. A solid, deformable, non-compressible material, such as urethane, having a generally cylindrical outer surface and generally planar end surfaces is located in the cavity. The solid, deformable, non-compressible material has a diameter slightly less than, but substantially equal to the diameter of the generally cylindrical inner surface of the cavity. The generally planar end surface of the piston rod is located in the cavity so that the solid, deformable, non-compressible material is located between the planar end surface of the piston rod and the generally planar bottom surface so that there exists a space into which the solid, deformable, non-compressible material can deform. Retaining means are provided for retaining the planar end surface of the piston rod in the cavity and are located to permit limited relative axial movement between the generally planar end surface of the piston rod and the generally planar bottom surface to deform the solid, deformable, non-compressible material until there is no further space for further deformation of the solid, deformable, non-compressible material to deform so its non-compressible characteristic will function to distribute the forces applied by the member evenly across the surface of the piston rod. Coupling means are provided for connecting the member to the reciprocating driving means so that the reciprocal movement of the reciprocating driving means reciprocates the coupling means, the member and the piston rod.

The retaining means comprise a flange portion formed on the piston rod and projecting radially outwardly therefrom. The flange portion has a generally cylindrical outer surface having a diameter slightly less than the diameter of the generally cylindrical inner surface of the cavity of the cavity. An annular slot is formed in the generally cylindrical inner surface of the cavity. A retaining ring has a portion thereof seated in the annular slot and another portion extending into the cavity. The another portion has an inner diameter less than the outer diameter of the generally cylindrical outer surface and is located to retain the flange portion in the cavity. The distance between the another portion and the generally planar bottom surface of the cavity is greater than the combined axial extents of the solid, deformable, non-compressible material and the flange portion between the another portion and the generally planar bottom surface of the cavity to allow for limited relative movement between the generally planar end surface of the piston rod and the generally planar bottom surface. The coupling means comprise a split clamping means comprising at least a pair of arcuate sections. Each of the at least a pair of arcuate sections having a circumferential extent less than 180 degrees and an arcuate inner surface. The arcuate inner surface has an arcuate recess formed therein which arcuate recess has at least a pair of facing surfaces. The member has a surface located to be contacted by one of the at least a pair of facing surfaces and the reciprocating driving means also has a surface located to be contacted by the other of the at least a pair of facing surfaces. The inner surfaces of the at least a pair of sections are in a facing relationship. Force applying means are provided for applying a force to the pair of sections to move the at least a pair of sections toward each other. The force applying means comprise a pair of spaced apart passageways extending through portions of each of the at least a pair of sections. The passageways in one of the at least a pair of sections are in alignment with the passageways in the other of the pair of sections. A bolt having an enlarged head portion extends through each pair of aligned passageways and has a threaded end portion. A nut is in threaded engagement with the threaded end portion so that rotation of the nut will move the nut toward the enlarged head portion to apply a force on the pair of sections.

In another preferred embodiment of the invention, the joint comprises a piston rod connected to a piston in a cylinder and having a longitudinal axis and a generally planar end surface. Reciprocating driving means, having a longitudinal axis, are provided for reciprocating the piston rod and therefore the piston in the cylinder. A member is located between the piston rod and the reciprocating driving means and has a generally planar surface facing the generally planar end surface of the piston rod. A solid, deformable, non-compressible material, such as urethane, is provided and has a generally cylindrical outer surface and generally planar opposite surfaces and is located between the generally planar end surface of the piston rod and the generally planar surface of the member. Holding means are provided for holding the piston rod, the solid, deformable, non-compressible material, the member and the reciprocating driving means so that the reciprocal movement of the reciprocating driving means reciprocates the holding means, the solid, deformable, non-compressible material, the member and the piston rod in a desired arrangement. The holding means permit limited relative movement between the piston rod and the member to deform the solid, deformable, non-compressible material until there is no further room for further deformation of the solid, deformable, non-compressible material. The holding means comprise at least a pair of arcuate sections. Each of the at least a pair of arcuate sections having an arcuate inner surface. The arcuate inner surface has an arcuate recess formed therein, which arcuate recess has at least a pair of facing surfaces. The piston rod has a surface located to be contacted by one of the at least a pair of facing surfaces and the reciprocating driving means has a surface located to be contacted by the other of the at least a pair of facing surfaces. Force applying means are provided for applying a force to the at least a pair of sections to move the at least a pair of sections toward each other. The force applying means comprises a pair of spaced apart passageways extending through portions of each of the at least a pair of sections. The passageways in one of the at least a pair of sections are in alignment with the passageways in the other of the at least a pair of sections. A bolt having an enlarged head portion extends through each pair of aligned passageways and has a threaded end portion. A nut is in threaded engagement with the threaded end portion so that rotation of the nut will move the nut toward said head portion to apply said force on the at least a pair of sections. Each of the arcuate inner surfaces having an arcuate extent of about 180 degrees so that when the at least a pair of sections are in contacting relationship, they provide a generally cylindrical inner surface. A flange is formed on the piston rod and projecting radially outwardly therefrom. The flange has a generally cylindrical outer surface having a diameter slightly less than the diameter of the generally cylindrical inner surface of the cavity. The member has a generally cylindrical outer surface having a diameter slightly less than the diameter of the generally cylindrical inner surface. The distance between the at least a pair of facing surfaces of the holding means is greater than the combined axial extent of the flange portion, the solid, deformable, non-compressible material and the member between the pair of facing surfaces to provide for limited relative axial movement between the piston rod, the solid, deformable, non-compressible material and the member.

BRIEF DESCRIPTION OF THE DRAWINGS

An illustrative and presently preferred embodiment of the invention is shown in the accompanying drawings in which.

DETAILED DESCRIPTION OF THE INVENTION

Figure 1:
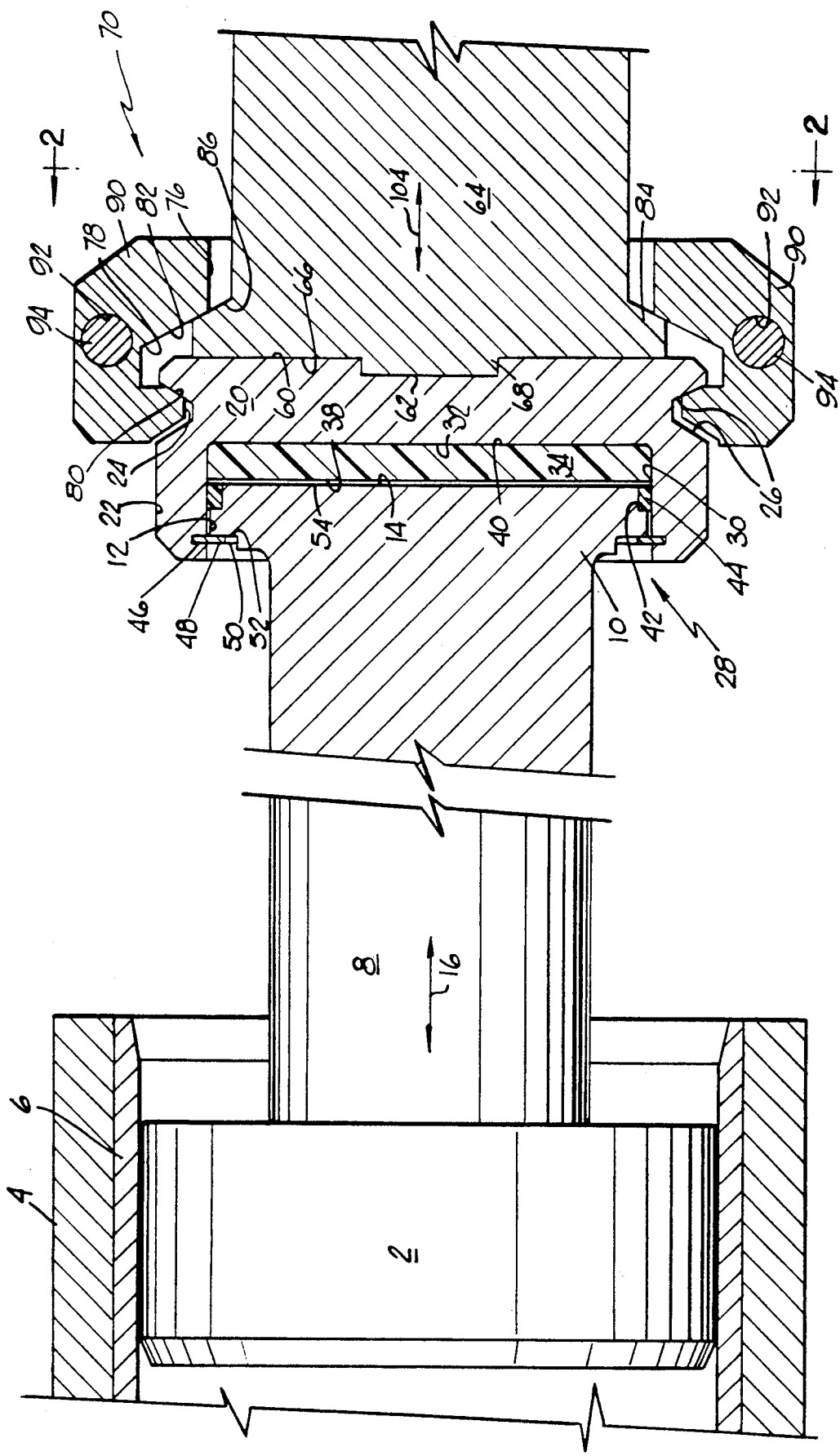
FIG. 1 is a side elevational view with parts in section of one preferred embodiment of the invention.
Figure 2:
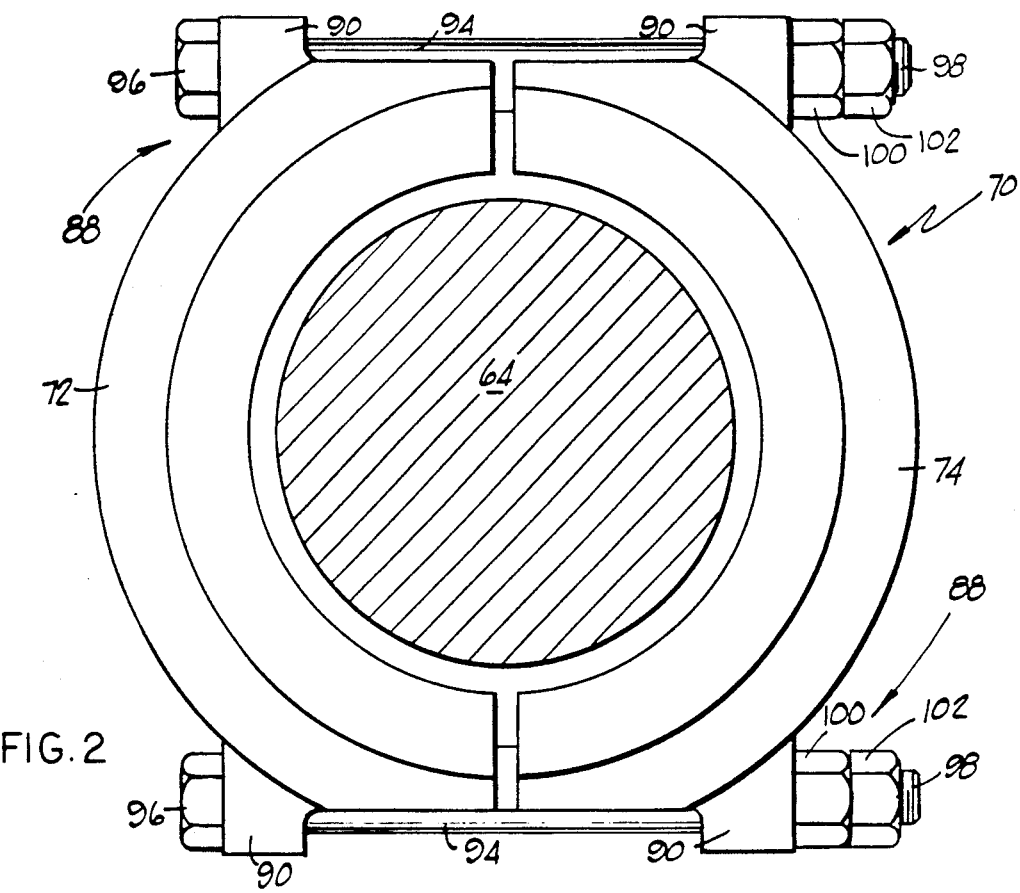
FIG. 2 is a cross-sectional view taken on the line 2—2 of FIG. 1.

In FIGS. 1 and 2, there is illustrated one preferred embodiment of the invention. A piston 2 is mounted for reciprocating movement in a cylinder 4 having a ceramic liner 6. A piston rod 8 extends outwardly from the piston 2. The piston rod 8 has a flange portion 10 projecting radially outwardly therefrom. The flange portion 10 has a generally cylindrical outer surface 12. The piston rod 8 has a generally planar end surface 14 and has a longitudinal axis 16.

A member 20 is provided and has a generally cylindrical outer surface 22 having a radially inwardly extending groove 24 formed therein and having sloping sidewalls 26. The member 20 has a cavity 28 formed therein. The cavity 28 has a generally cylindrical inner surface 30 and a generally planar bottom surface 32. A solid, deformable, non-compressible material 34 is located in the cavity 28 and has a generally cylindrical outer surface 36 having a diameter slightly less than the diameter of the generally cylindrical inner surface 30. The solid, deformable, non-compressible material 34 has a generally planar surface 38 located to be contacted by the generally planar end surface 14 and a generally planar surface 40 located to be contacted by the generally planar bottom surface 32. An annular recess 42 is formed in the generally cylindrical outer surface 12 and the generally planar end surface 14. A sealing gasket 44, formed from a material, such as the produce marketed by DuPont under the trade designation Hytrel, is seated in the annular recess 42 and functions to prevent the extrusion of the solid, deformable, non-compressible material 34 out of the cavity 28 when a force is applied thereto. An annular slot 46 is formed in the generally cylindrical inner surface 30 and a retaining ring 48 is seated therein and has a generally cylindrical inner surface 50 having a diameter less than the diameter of the generally cylindrical outer surface 12 so that it can be contacted by the annular surface portion 52 on the flange portion 10. The distance between the retaining ring 48 and the generally planar bottom surface 32 is greater than the combined axial extent of the flange portion 10 and the solid, deformable, non-compressible material 34 between the retaining ring 48 and the generally planar bottom surface 32 to permit the formation of a space 54 between the generally planar end surface 14 and the generally planar surface 38. While the space 54 is illustrated in that location in FIG. 1, the space 54 could be formed between the generally planar surface 40 and the generally planar bottom surface 32 or a portion of the space 54 could be at each of the above locations. The space 54 permits limited relative movement between the generally planar end surface 14 and the generally planar bottom surface 32 to deform the solid, deformable, non-compressible material 34 until there is no further space into which it can deform so that the non-compressible characteristics will function to distribute the forces being applied by the generally planar bottom surface 32 and will be distributed evenly across the generally planar end surface 14 so that there are no forces tending to move the piston rod 8 out of alignment with the cylinder 4. The generally cylindrical outer surface 12 has a diameter slightly less than the diameter of the generally cylindrical inner surface 30 for purposes described below.

The member 20 has a generally planar surface 60 having a recess 62 formed therein. A cross head rod 64 has a generally planar end surface 66 for engagement with the generally planar end surface 60 and a projecting portion 68 for mating engagement in the recess 62. Coupling means 70 are provided for securing the member 20 and the cross head rod 64 together. As illustrated in FIGS. 1 and 2, the coupling means 70 comprise a split ring clamp having at least a pair of arcuate sections 72 and 74 having a circumferential extent of less than 180 degrees and an arcuate inner surface 76. An arcuate recess 78 is formed in the arcuate inner surface 76 and has facing sloping surfaces 80 and 82. The cross head rod 64 has a flange portion 84 having a sloping surface 86. As illustrated in FIG. 1, the sloping surface 26 is in contacting relationship with the sloping surface 80 and the sloping surface 86 is in contacting relationship with the sloping surface 82. Force applying means 88, FIG. 2, are provided for moving the arcuate sections 72 and 74 toward each other. The force applying means comprises a plurality of spaced apart lugs 90 each having a passageway 92 extending therethrough. When the arcuate sections 72 and 74 are in a facing relationship, the passageways 92 in the arcuate section 72 are in alignment with the passageways 92 in the arcuate section 74. A bolt 94 having an enlarged head portion 96 and an externally threaded end portion 98 is passed through the aligned passageways 92. An internally threaded nut 100 is in threaded engagement with the threaded end portion so that clockwise rotation of the threaded nut 100 will move the arcuate sections 72 and 74 toward each other so that the sloping surfaces 26, 80, 82 and 86 will move into a clamping relationship to hold the member 20 securely on the cross head rod 64. A threaded lock nut 102 holds the arcuate sections 72 and 84 in the clamping relationship. The cross head rod 64 is connected to suitable conventional means, such as a motor (not shown), so as to reciprocate the cross head rod 64 and the member along the longitudinal axis 104.

In operation, the return stroke of the piston rod 8 will move the retaining ring 48 into contact with the annular surface 52 to form the space 54. The forward stroke of the cross head rod 64 moves the member 32 toward the piston rod 8. If there is any misalignment between the longitudinal axes 16 and 104, the generally planar bottom surface 32 will be canted relative to the generally planar end surface 14. The difference in the diameters of the generally cylindrical inner surface 30 and the generally cylindrical outer surface 12 allows for the canting relationship. When a portion of the solid, deformable, non-compressible material 34 is in contacting relationship with the generally planar bottom surface 32 and the generally planar end surface 14, the continued movement of the generally planar surface 32 will deform the solid, deformable, non-compressible material 34 to fill whatever shape of space that exists between the generally planar bottom surface 32 and the generally planar end surface 14. Because of the non-compressible characteristics of the solid, deformable, non-compressible material 34, the driving forward force of the cross head rod 64 will be transmitted to the piston rod 8 uniformly and in one direction across the generally planar end surface 14. The one direction will be parallel to the longitudinal axis of the piston rod 8. Because of this operation, there will be substantially no force tending to change the longitudinal axis of the piston rod 8 with the longitudinal axis of the cylinder 4. While the preferred shape of the solid, deformable, non-compressible material 34 is as described above, other shapes, such as protuberances or dimples on the surfaces 38 and 40 or recesses in the surface 36, may be used as long as the volume of the solid, deformable, non-compressible material 34 is less than the volume of the space formed by the generally planar end surface 14, the sealing gaskets 44, the generally cylindrical inner surface 30 and the generally planar bottom surface 32 when the annular surface portion 52 is in contacting relationship with the retaining ring 48. It is preferred that the overall shape of the solid, deformable, non-compressible material 34 be generally similar to the overall shape of the space.

Figure 3:
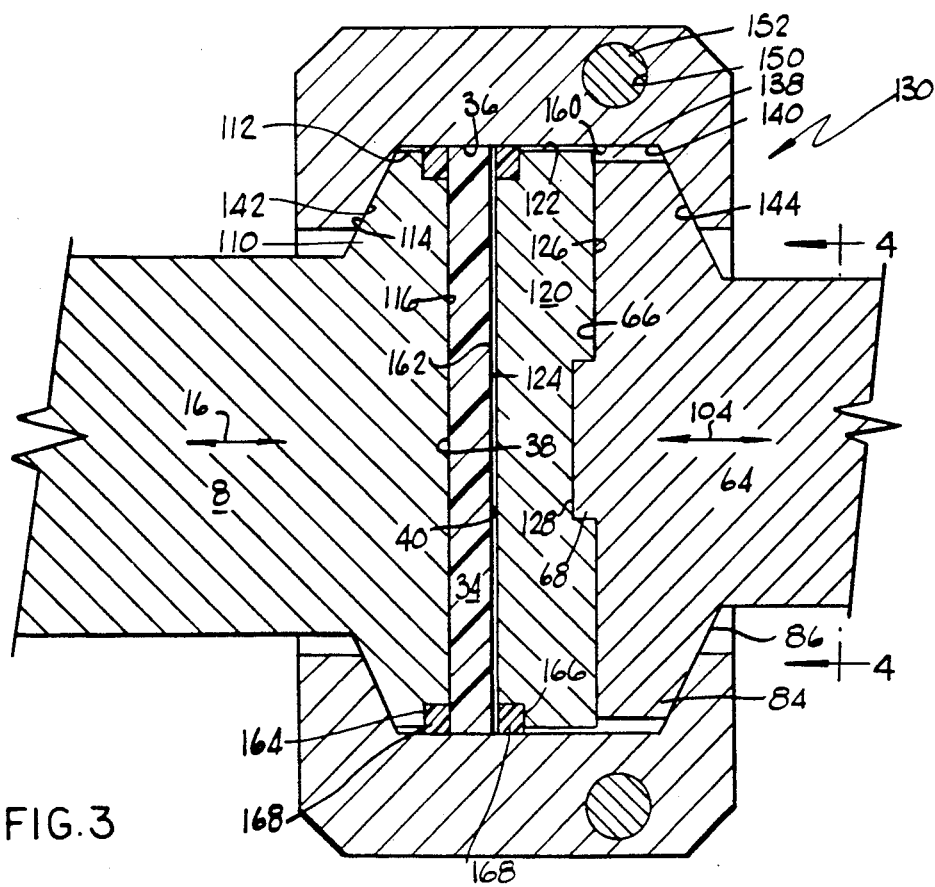
FIG. 3 is a sectional view of another preferred embodiment of the invention.
Figure 4:
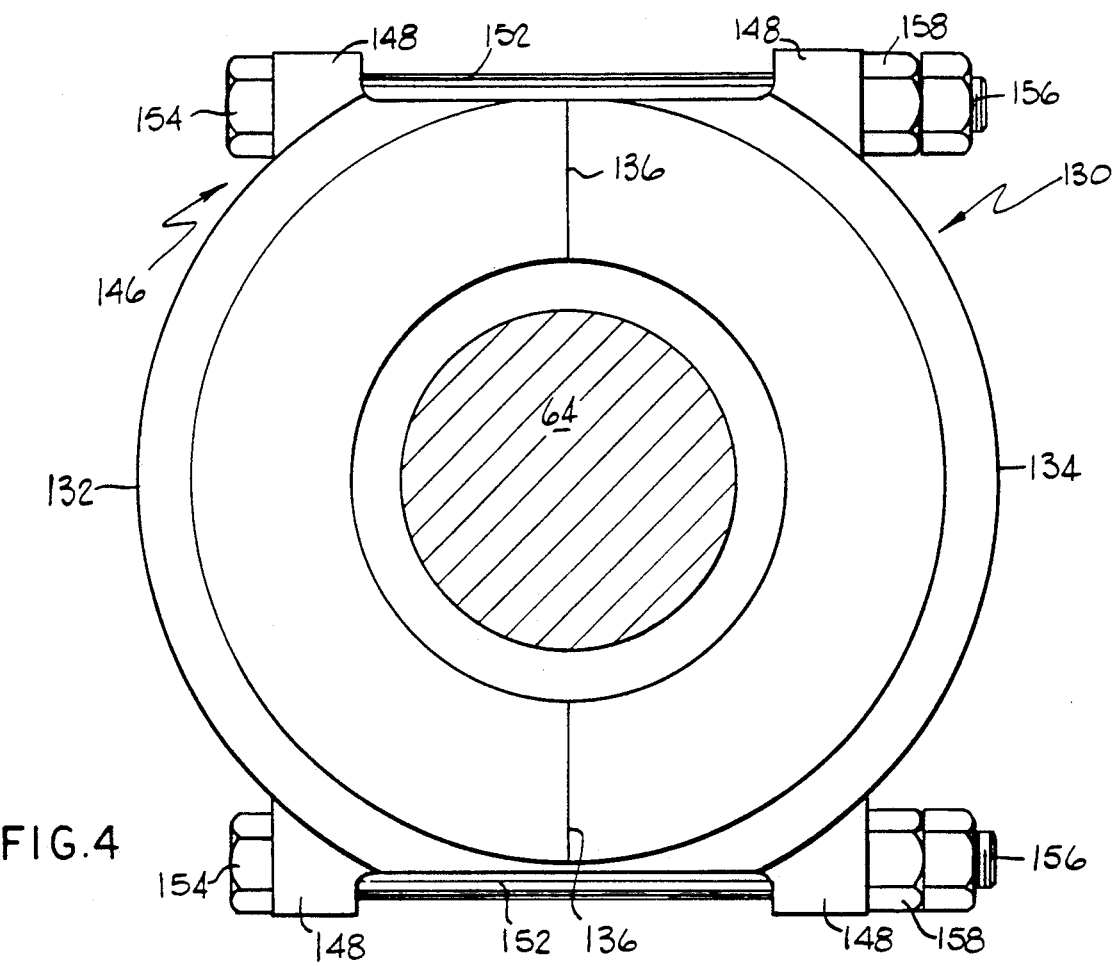
FIG. 4 is a cross-sectional view taken on the line 4—4 of FIG. 3.

Another preferred embodiment of the invention is illustrated in FIGS. 3 and 4 wherein parts corresponding to those in FIGS. 1 and 2 have been given the same reference numerals. The piston rod 8 has a flange portion 110 projecting radially outwardly therefrom and has a generally cylindrical outer surface 112 and a sloping surface 114. The piston rod 8 has a generally planar end surface 116 and has a longitudinal axis 16.

A member 120 is provided and has a generally cylindrical outer surface 122 and a generally planar surface 124 facing the generally planar end surface 116. A solid, deformable, non-compressible material 34 is located between the generally planar end surface 116 and the generally planar surface 124. The solid, deformable, non-compressible material has a generally cylindrical outer surface 36, a generally planar surface 38 located to contact the generally planar end surface 116 and a generally planar surface 40 located to be contacted by the generally planar surface 124. The member 120 has a generally planar surface 126 for engagement with the generally planar surface 66. A recess 128 is formed in the generally planar surface 126 for mating engagement with the projection portion 68.

A housing 130 is provided and comprises two semicircular sections 132 and 134 having radially extending end surfaces 136 for mating engagement. Each of the semi-circular sections 132 and 134 has a semi-circular recess 138 formed therein and comprising a generally semi-cylindrical surface 140 and sloping side surfaces 142 and 144. Force applying means 146 are provided for holding the semi-circular sections 132 and 134 in an assembled condition. The force applying means comprise a plurality of spaced apart lugs 148 each having a passageway 150 extending therethrough. When the semi-circular sections 132 and 134 are in a facing relationship, the passageways 150 in the semi-circular section 132 are in alignment with the passageways 150 in the semi-circular section 134. A bolt 152 having an enlarged head portion 154 and an externally threaded end portion 156 is passed through the aligned passageways 150. An internally threaded nut 158 is in threaded engagement with the externally threaded end portion 156 so that clockwise rotation of the nut 158 will move the semi-circular sections toward each other until the radially extending surfaces 136 are in a contacting relationship. In this relationship, the semi-cylindrical surfaces 140 form a generally cylindrical surface 160 having a diameter slightly greater than the generally cylindrical outer surfaces 112, 36 and 122. The distance between the sloping surfaces 142 and 144 is slightly greater than the combined axial extents of the flange 110, the solid, deformable, non-compressible material 34, the member 120 and the flange 84 between the sloping surfaces 142 and 144 to permit the formation of a space 162 between the generally planar surface 40 and the generally planar surface 124. While the space 162 is illustrated in that position in FIG. 3, the space 162 could be formed between the generally planar end surface 116 and the generally planar surface 38 or a portion of the space 162 could be at each of the above locations.

In operation, the return stroke of the piston rod 8 will move the sloping surfaces 114 and 142 into contacting relationship to form the space 162. The forward stroke of the cross head rod 64 moves the member 120 toward the piston rod 8. If there is any misalignment between the longitudinal axes 16 and 104, the generally planar surface 124 will be canted relative to the generally planar end surface 116. The difference in the diameters of the generally cylindrical surface 160 formed by the semi-cylindrical surfaces 140 and the generally cylindrical outer surfaces 12 or 122 allows for the canting relationship. When portions of the solid, deformable, non-compressible material 34 are in contacting relationship with the generally planar surface 124 and the generally planar end surface 116, the continued movement of the generally planar surface 124 will deform the solid, deformable, non-compressible material 34 to fill whatever shape of space that exists between the generally planar surface 124 and the generally planar end surface 116 until the solid, deformable, non-compressible material 34 reaches its non-compressible state. As stated above, because of the non-compressible characteristic of the solid, deformable, non-compressible material, the driving forward force of the cross head rod 64 will be transmitted to the piston rod 8 uniformly and in one direction across the generally planar end surface 116a. The one direction will be parallel to the longitudinal axis of the piston rod 8. Because of this operation, there will be substantially no force tending to change the longitudinal axis of the piston rod 8 with the longitudinal axis of the cylinder 4.

An annular recess 164 is formed in the generally cylindrical outer surface 112 and the generally planar end surface 116 and an annular recess 166 is formed in the generally cylindrical outer surface 122 and the generally planar surface 124. A sealing gasket 168, formed from a material, such as that marketed by DuPont under the trade designation Hytrel, is seated in each of the annular recesses 164 and 166 and functions to prevent the extrusion of the solid, deformable non-compressible material 34 when a force is applied thereto.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A joint for increasing the working life of a pump having a cylinder and a piston mounted for reciprocation in the cylinder comprising:

a piston rod extending from said piston and having a longitudinal axis;

said piston rod having a generally planar end surface;

reciprocating driving means for reciprocating said piston rod and therefore said piston in said cylinder;

said reciprocating driving means having a longitudinal axis;

a member located between said piston rod and said reciprocating driving means and having a cavity formed therein;

said cavity having a generally cylindrical inner surface and a generally planar bottom surface;

said generally planar end surface of said piston rod being located in said cavity;

retaining means for retaining said planar end surface of said piston rod in said cavity;

said retaining means located to form a space defined by said planar end surface of said piston rod, said generally cylindrical inner surface and said generally planar bottom surface when said piston rod is in contact with said retaining ring;

a solid, deformable, non-compressible material located in said space;

said solid, deformable, non-compressible material having a volume less than the volume of said space to permit limited relative movement between said planar end surface of said piston rod and said generally planar bottom surface to deform said solid, deformable, non-compressible material until it fills said space and the non-compressible characteristic thereof functions to distribute the forces applied by said member uniformly across said generally planar end surface; and coupling means for connecting said member and said reciprocating driving means so that the reciprocal movement of said reciprocating driving means reciprocates said coupling means, said member and said piston rod.

2. The invention as in claim 1 wherein said retaining means comprises:

a flange portion formed on said piston rod and projecting radially outwardly therefrom;

said flange portion having a generally cylindrical outer surface having a diameter slightly less than the diameter of said generally cylindrical inner surface;

an annular slot formed in said generally cylindrical inner surface;

a retaining ring seated in said annular slot; and said retaining ring having an inner diameter less than the outer diameter of said generally cylindrical outer surface and being located to retain said flange portion in said cavity.

3. The invention as in claim 2 wherein:

the distance between said retaining rod and said generally planar bottom surface is greater than the combined axial extents of said solid, deformable, non-compressible material and said flange portion.

4. The invention as in claim 2 and further comprising:

an annular recess formed in said generally cylindrical outer surface of said flange portion and said generally planar surface of said piston rod; and retaining means in said annular recess for preventing extrusion of said solid, deformable, non-compressible material out of said cavity when a relatively high force is applied thereto.

5. The invention as in claim 1 wherein said coupling means comprises:

a split clamping means.

6. The invention as in claim 5 wherein said retaining means comprises:

a flange formed on said piston rod and projecting radially outwardly therefrom;

said flange having a generally cylindrical outer surface having a diameter slightly less than the diameter of said generally cylindrical inner surface;

an annular slot formed in said generally cylindrical inner surface;

a retaining ring seated in said annular slot; and said retaining ring having an inner diameter less than the outer diameter of said generally cylindrical outer surface and being located to retain said flange in said cavity.

7. The invention as in claim 5 wherein:
said solid, deformable, non-compressible material has a generally cylindrical outer surface and generally planar end surfaces.

8. The invention as in claim 7 wherein:
the distance between said retaining ring and said generally planar bottom surface is greater than the combined axial extents of said solid, deformable, non-compressible material and said flange portion.

9. The invention as in claim 5 wherein said split clamping ring comprises:
at least a pair of arcuate sections;
each of said at least a pair of arcuate sections having a circumferential extent less than 180 degrees;
each of said at least a pair of arcuate sections having an arcuate inner surface;
said arcuate inner surface having an arcuate recess formed therein, said arcuate recess having at least a pair of facing sloping surfaces;
said member having a sloping surface located to be contacted by one of said at least a pair of facing sloping surfaces;
said reciprocating driving means having a sloping surface located to be contacted by the other of said at least a pair of facing sloping surfaces;
said inner surfaces of said at least a pair of sections being in a facing relationship; and
force applying means for applying a force to said at least a pair of sections to move said at least a pair of sections toward each other.

10. The invention as in claim 9 wherein said force applying means comprises:
a pair of spaced apart passageways extending through portions of each of said at least a pair of sections;
said passageways in one of said at least a pair of sections being in alignment with said passageways in the other of said pair of sections;
a bolt having an enlarged head portion extending through each pair of aligned passageways and having a threaded end portion; and
a nut in threaded engagement with said threaded end portion so that rotation of said nut will move said nut toward said enlarged head portion to apply said force on said pair of sections.

11. A joint for increasing the working life of a pump having a cylinder and a piston mounted for reciprocation in the cylinder comprising:
a piston rod extending from said piston and having a longitudinal axis;
said piston rod having a generally planar end surface;
reciprocating driving means for reciprocating said piston rod and therefore said piston in said cylinder;
said reciprocating driving means having a longitudinal axis;
a member located between said piston rod and said driving means;
said member having a generally planar surface facing said generally planar end surface;
a solid, deformable, non-compressible material located between said generally planar end surface and said generally planar surface;
housing means for containing at least portions of said piston rod, said solid, deformable, non-compressible material, said member and said reciprocating driving means to form a space for permitting deformation of said solid, deformable, non-compressible material and so that the reciprocal movement of said reciprocating driving means reciprocates said housing means, said solid, deformable, non-compressible material, said member and said piston rod;
said housing means comprising at least a pair of arcuate sections;
each of said arcuate sections having spaced apart end surfaces;
force applying means for applying a force to said at least a pair of arcuate sections to hold said spaced apart ends surfaces on one of said at least a pair of arcuate sections in contact with said spaced apart end surfaces on the other of said at least a pair of arcuate sections; and
said housing means permitting limited relative movement between said piston rod and said member to deform said solid, deformable, non-compressible material until it fills said space and the non-compressible characteristic thereof functions to distribute the forces applied by said member uniformly across said generally planar end surface.

12. The invention as in claim 11 wherein said housing means further comprise:
each of said at least a pair of arcuate sections having an arcuate inner surface;
said arcuate inner surface having an arcuate recess formed therein, said arcuate recess having at least a pair of facing surfaces;
said piston rod having a surface located to be contacted by one of said at least a pair of facing surfaces;
said reciprocating driving means having a surface located to be contacted by the other of said at least a pair of facing surfaces; and
said arcuate inner surfaces of said at least a pair of sections being in a facing relationship.

13. The invention as in claim 12 wherein said force applying means comprises:
a pair of spaced apart passageways extending through portions of each of said at least a pair of sections;
said passageways in one of said at least a pair of sections being in alignment with said passageways in the other of said at least a pair of sections;
a bolt having an enlarged head portion extending through each pair of aligned passageways and having a threaded end portion; and
a nut in threaded engagement with said threaded end portion so that rotation of said nut will move said nut toward said head portion to apply said force on said at least a pair of sections.

14. The invention as in claim 13 wherein:
each of said arcuate inner surfaces having an arcuate extent of about 180 degrees so that when said at least a pair of sections are in contacting relationship, they provide a generally cylindrical inner surface.

15. The invention s in claim 14 and further comprising:
a flange formed on said piston rod and projecting radially outwardly therefrom;
said flange having a generally cylindrical outer surface having a diameter slightly less than the diameter of said generally cylindrical inner surface; and said member having a generally cylindrical outer surface having a diameter slightly less than the diameter of said generally cylindrical inner surface.

16. The invention as in claim 15 and further comprising:

the axial distance between said at least a pair of facing surfaces of said holding means at any given location being greater than the combined axial extent of said flange portion, said solid, deformable, non-compressible material and said member to provide for said limited relative movement between said piston rod and said member.

17. The invention as in claim 15 and further comprising:

a first annular recess formed in said generally cylindrical outer surface of said flange and said generally planar end surface of said piston rod;

a second annular recess formed in said generally cylindrical outer surface of said member and said generally planar surface of said member; and retaining means in said first and second annular recesses for preventing extrusion of said solid, deformable, non-compressible material.

18. The invention as in claim 11 wherein:

said solid, deformable, non-compressible material has a generally cylindrical outer surface and generally planar end surfaces.

19. The invention as in claim 18 wherein said solid, deformable, non-compressible material comprises: urethane.

* * * * *

UNITED STATES PATENT AND TRADEMARK OFFICE
CERTIFICATE OF CORRECTION

PATENT NO. : 5,085,129
DATED : February 4, 1992
INVENTOR(S) : Larry M. Dugan

It is certified that error appears in the above-identified patent and that said Letters Patent is hereby corrected as shown below:

In the Claims

Claim 3, Column 8, line 44, "retaining rod" should read -- retaining ring --.

Claim 15, Column 10, line 62, "invention s" should read --invention as--.

Claim 16, Column 11, line 8, "holding" should read --housing--.

Signed and Sealed this

Fourth Day of May, 1993

Attest:

MICHAEL K. KIRK

Attesting Officer

Acting Commissioner of Patents and Trademarks